(12) United States Patent
Medina et al.

(10) Patent No.: US 10,596,525 B2
(45) Date of Patent: Mar. 24, 2020

(54) ADVANCED FILTRATION MEMBRANES USING CHITOSAN AND GRAPHENE OXIDE

(71) Applicant: United States of America as Represented by The Secretary of The Army, Alexandria, VA (US)

(72) Inventors: Victor F Medina, Clinton, MS (US); Christopher S Griggs, Vicksburg, MS (US); Jose Mattei-Sosa, Vicksburg, MS (US); Brooke Petery, Schwenksville, PA (US); Luke Gurtowski, Vicksburg, MS (US)

(73) Assignee: UNITED STATES OF AMERICA AS REPRESENTED BY THE SECRETARY OF THE ARMY, Alexandria, VA (US)

(*) Notice: Subject to any disclaimer, the term of this patent is extended or adjusted under 35 U.S.C. 154(b) by 0 days.

(21) Appl. No.: 15/671,043

(22) Filed: Aug. 7, 2017

(65) Prior Publication Data
US 2019/0039026 A1 Feb. 7, 2019

(51) Int. Cl.
| | |
|---|---|
| B01D 67/00 | (2006.01) |
| B01D 69/02 | (2006.01) |
| B01D 69/10 | (2006.01) |
| B01D 69/14 | (2006.01) |
| B01D 71/02 | (2006.01) |
| B01D 71/08 | (2006.01) |
| B01D 71/74 | (2006.01) |
| B01D 69/12 | (2006.01) |

(Continued)

(52) U.S. Cl.
CPC ....... B01D 69/148 (2013.01); B01D 67/0079 (2013.01); B01D 69/02 (2013.01); B01D 69/12 (2013.01); B01D 71/74 (2013.01); C02F 1/44 (2013.01); C02F 1/441 (2013.01); B01D 63/10 (2013.01); B01D 69/10 (2013.01); B01D 71/021 (2013.01); B01D 71/024 (2013.01); B01D 71/08 (2013.01); B01D 2319/06 (2013.01); B01D 2323/12 (2013.01); B01D 2323/30 (2013.01); B01D 2325/04 (2013.01); C02F 2303/04 (2013.01); C02F 2303/20 (2013.01)

(58) Field of Classification Search
None
See application file for complete search history.

(56) References Cited

U.S. PATENT DOCUMENTS

| | | | | | |
|---|---|---|---|---|---|
| 4,659,343 | A | * | 4/1987 | Kelly | B01D 53/22 210/640 |
| 5,846,421 | A | * | 12/1998 | Ohtani | B01D 63/061 210/493.2 |
| 2010/0193436 | A1 | * | 8/2010 | Ruehr | B01D 61/025 210/636 |

OTHER PUBLICATIONS

Shao, Lu et al—"Graphene oxide cross-linked chitosan nanocomposite membrane"—Applies Surface Science 280 (2013) 989-992—May 2, 2013 (Year: 2013).*

(Continued)

*Primary Examiner* — Bradley R Spies
(74) *Attorney, Agent, or Firm* — Brian C. Jones

(57) ABSTRACT

A composition of five parts by mass of chitosan and one part graphene oxide is suspended in water. The composition may be used to form filtration layers of any size or shape and may be reinforced by additional layers. The composition may be used to construct a large filtration apparatus of any size or shape and may be used to form highly resilient, antimicrobial structures and surfaces for a variety of applications.

10 Claims, 10 Drawing Sheets

(51) Int. Cl.
*C02F 1/44* (2006.01)
*B01D 63/10* (2006.01)

(56) References Cited

OTHER PUBLICATIONS

Pandele, Andreea Madalina et al—"Porous Chitosan/Graphene Oxide Biocomposites for Tissue Engineering"—Polymer Composites 2017/ Wiley Online Library 2015 (Year: 2015).*

* cited by examiner

| Membrane composition | Flow (mL/min) | Flux (LMH) |
|---|---|---|
| Graphene Oxide | 0.0042 | 0.7 |
| Chitosan Graphene Oxide | 0.0134 | 2.2 |
| Reverse Osmosis | 0.0005 | 0.08 |
| Nano Filtration Membrane | 0.1283 | 21.2 |

FIG. 10

| Membrane | Starting Concentration (mg/L) | Ending Concentration (mg/L) | Percentage Removal |
|---|---|---|---|
| Graphene Oxide | 7.50 | 0.15 | 98.0% |
| Chitosan Graphene Oxide | 7.50 | 0.19 | 97.5% |
| Nano Filtration | 6.49 | 0.09 | 98.6% |

ADVANCED FILTRATION MEMBRANES USING CHITOSAN AND GRAPHENE OXIDE

STATEMENT REGARDING FEDERALLY SPONSORED RESEARCH OR DEVELOPMENT

The invention described herein was made by employees of the United States Government and may be manufactured and used by the Government of the United States of America for governmental purposes without payment of royalties.

FIELD OF INVENTION

This invention relates to the field of water filtration devices, and more specifically to a highly resilient graphene filter.

BACKGROUND OF THE INVENTION

The U.S. Army Corps of Engineers Research and Development Center (ERDAC) has a mission to identify technologies to make clean water available and address global water shortages.

In furtherance of this mission, researchers at ERDAC's Environmental Labs have sought to identify superior materials from which more durable filtration devices can be constructed. It is a problem known in the art that current water filtration devices experience rapid deterioration and quickly wear out in harsh, corrosive chemical environments and during the process of desalination.

The cost of frequently replacing filtration devices is a significant economic barrier to bringing clean water to an estimated 63 million people that currently do not have access to it.

Various attempts have been made in the art to produce more durable, longer-lasting water filtration devices. Durable metals, are not suitable for constructing thin filter membranes that do not disrupt water flow.

In contrast, graphene is a material that is thought to be the strongest, thinnest and lightest material available and which can be used to form membranes.

However, it is a problem known in the art that graphene oxide filters, although highly durable, become deformable and unstable when immersed in water while used for the production of large filtration devices. This deformation allows smaller contaminate molecules and salts to flow through the pores of the filters, rendering them ineffective.

There is an unmet need for graphene oxide filters that exhibit the strength of life cycle of graphene, but which are not vulnerable to deformation and swelling as the size of the filtration membrane is increased.

BRIEF SUMMARY OF THE INVENTION

The invention is a chitosan graphene oxide (CSGO) filtration membrane comprised of five parts by mass of chitosan and one part graphene oxide suspended in water. The composition may be of any size or configuration. It is incubated under a slight vacuum. As the water evaporates, a membrane is cast into the mold.

The method for making the CGSO filter includes protonating a quantity chitosan to create protonated chitosan; evaporating a solution on a surface to create a membrane having a target thickness; and placing said membrane between two layers. In one embodiment, said quantity of chitosan and said quantity of graphene have a 5:1 ratio.

BRIEF DESCRIPTION OF THE DRAWINGS

FIG. 9 is a chart illustrating the the flux rate of a CSGO membrane as compared to other membrane compositions.

FIG. 10 is is a chart illustrating the comparative performance of a CSGO filter to a graphene oxide filter and an nano-filtration member.

TERMS OF ART

As used herein, the term "cross-linking" means binding two materials at the molecular level.

As used herein, the term "CSGO" means chitosan graphene oxide.

As used herein, the term "disk-shaped" means a disk-like structure of a filtration membrane.

As used herein, the term "filtration membrane" means a thin layer of semi-permeable material that separates molecules, particles or substances that pass through it.

As used herein, the term "highly-resilient" means durable and able to be used for various applications.

As used herein, the term "membrane support layer" means a structure for supporting a CSGO filter.

As used herein, the term "spiral wound" is a spiral-like structure of the filtration membrane.

As used herein, the term "target thickness" means a desired thickness to be achieved for creation of a filtration membrane relative to its intended use.

DETAILED DESCRIPTION OF THE DRAWINGS

Figure 1:
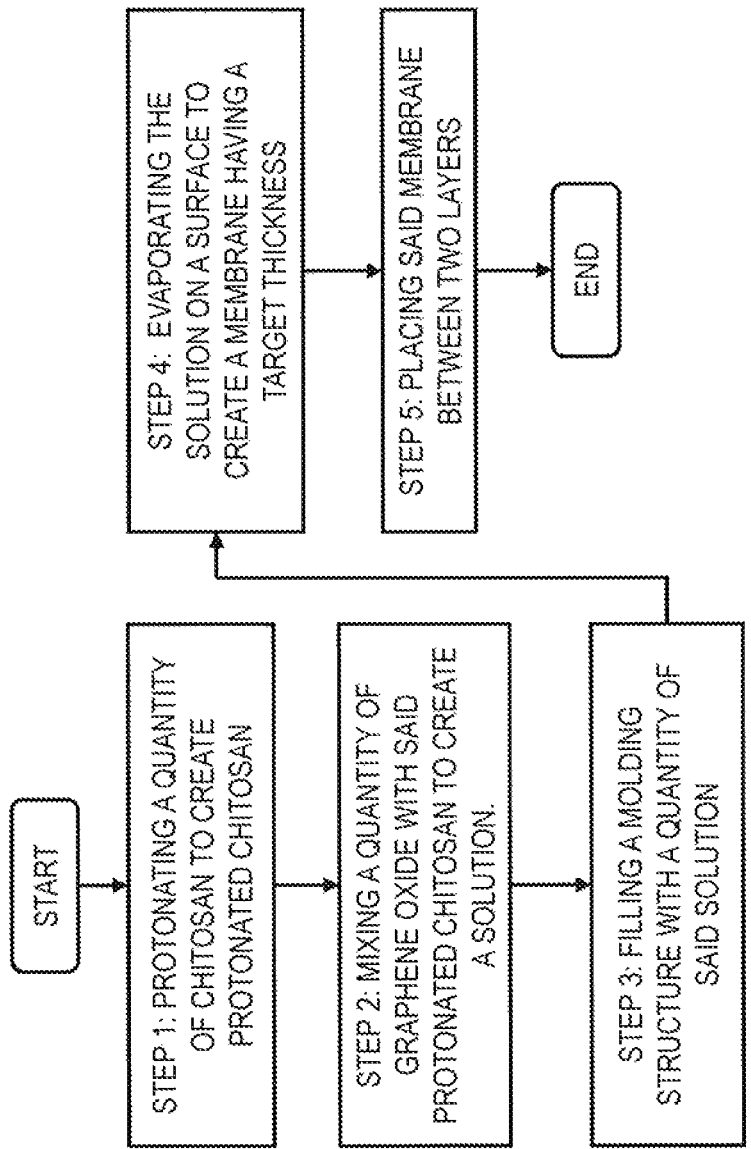
FIG. 1 is a flow chart of an exemplary method for producing a highly resilient chitosan graphene oxide (CSGO) filter.

FIG. 1 is a flow chart of an exemplary method for producing a highly resilient chitosan graphene oxide (CSGO) filter.

Step 1 is the step of protonating a quantity of chitosan to create protonated chitosan. In this step, a quantity of chitosan is mixed with an acid to create positively charged (protonated) chitosan. The acid is an organic acid.

In one exemplary embodiment, acetic acid is used to protonate the compound. In various embodiments, other acids may be used, including but not limited to Acetic Acid, Malic, Succinic Acid, Glycolic Acid, Oxalic Acid, Adipic Acid, Citric Acid, Formic Acid, Carboxylic Acid, Sulfonic Acid, Muriatic Acid and Tannic Acid.

Step 2 is the step of mixing a quantity of graphene oxide with said protonated chitosan to create a solution. It is a problem known in the art that Chitosan is not water soluble. This step produces a homogeneous mixture by rendering the chitosan water soluble, which may then be mixed with graphene oxide. In the exemplary embodiment shown chitosan and graphene oxide must be combined in a 5:1 ratio.

Step 3 is the step filling a molding structure with a quantity of said solution. It is necessary to make sure the mixture is well stilled to create a homogeneous composition.

Step 4 is the step of evaporating the solution on a surface to create a membrane having a target thickness. Evaporation of the graphene oxide and chitosan composition may be accomplished at room temperature. During the evaporation process, cross-linking of the graphene oxide and chitosan occurs.

In various embodiments, convective air flow may be employed to accelerate the evaporation process. In other embodiments, heat may be used to expedite the evaporation process. Reducing air pressure will also expedite the . evaporation process.

The target thickness is a function of a molecular size of the contaminant versus that of the filtration target along with the criteria for filtering contaminates selectively. In certain embodiments, this is generally within a range of 5 to 200 microns. Thinner membranes allow faster flux and flow but are less resilient than thicker membranes.

In the exemplary embodiment shown, a mold is used to form the filtration membrane. In one exemplary embodiment, the mold is a smooth, non-absorbent sheet with edges to retain the composition. The composition is poured into the mold and allowed to evaporate.

Step 5 is the step of placing said membrane between two layers. The membrane in the previous step may be sufficient for one-directional fluid flow. For example, treatment of the filters by strong base (pH>10) or thermally may result in stable performance without the use of additional layers or filters. However, it may be desirable to provide additional support for the filtration membrane for bi-directional water flow (cross-flow) by affixing layers to the filtration membrane.

The filtration membrane may be placed between or in contact with one or more membrane support layers of different material. The support layer reinforces the filtration membrane.

The CSGO filter resulting from the above described method may be scaled for any application. It may be used in situ, adapted for equipment or placed within various pipes, valves, tanks, receptacles and other water and gas barriers and structures.

In various embodiments, the CSGO filter may be die cut, punched or extruded. The die cut filter may be used for gas filtering applications as well as for water filtering. Exemplary embodiments include but are not limited to gas separations, $CO_2$ capture, visible light photocatalysis, etc. The die cut filter may further be used for point of use water purification, antimicrobial surfaces and coatings, etc.

The filter may also be used for antimicrobial purposes and is less susceptible to fouling. Anti-microbial activity was tested bacterial growth in solution and on the membrane surface, respectively. The CSGO material inhibited bacterial growth in solution relative to cellulose filtration membranes and commercial reverse osmosis membranes as measured using optical density (OD 600 nm). In addition, the CSGO filter may inhibit biofilm formation on the membrane surface as determined by growth on agar plates.

Other uses for large scale graphene oxide filters resulting from the foregoing may include drinking water treatment in large water treatment plants, industrial wastewater treatment, water reuse applications, deployable treatment systems, removal of salts in individual groundwater treatment systems, treatment of groundwater using pump and treat systems, supplementary home water treatment for the removal of contaminants (e.g., lead), etc.

Still yet, in other embodiments the graphene oxide filters can be configured for specialized use within equipment, such as for a refrigerator filter or as a filter to remove sediment, microorganisms, impurities and the like within a laboratory device. Moreover, the graphene oxide filters can be used for Water softening and for mobile purification for individual water, such as camping, deployed military forces, disaster response, etc.

Figure 2:
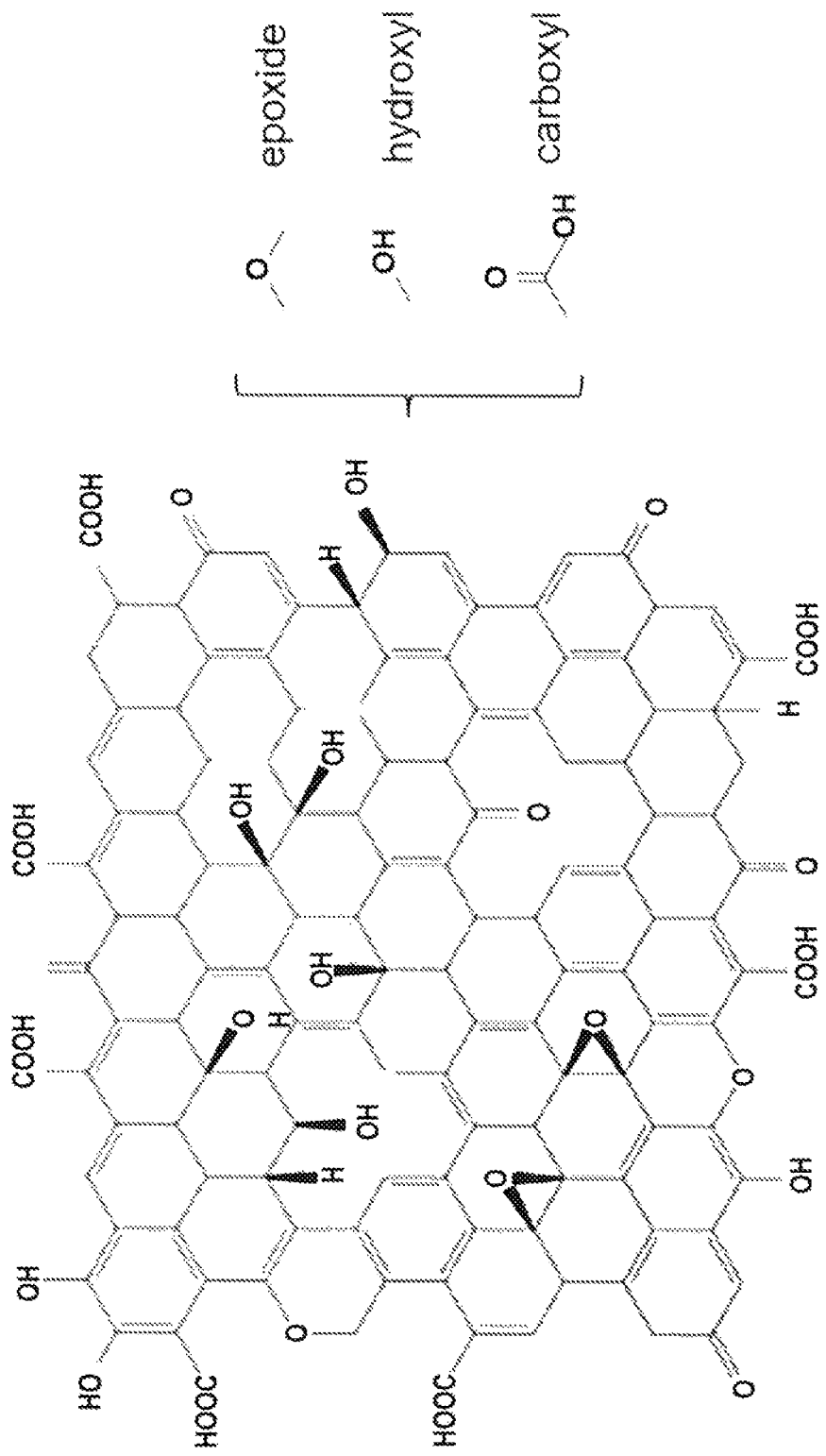
FIG. 2 (Prior Art) illustrates the structural makeup of graphene oxide and an exemplary oxide group.

FIG. 2 (Prior Art) illustrates the structural makeup of graphene oxide and an exemplary oxide group. Graphene is impermeable and membranes constructed from it are not known to be used commercially to produce filtration membranes The introduction of oxides results in a permeable, cross-linked compound.

Figure 3:
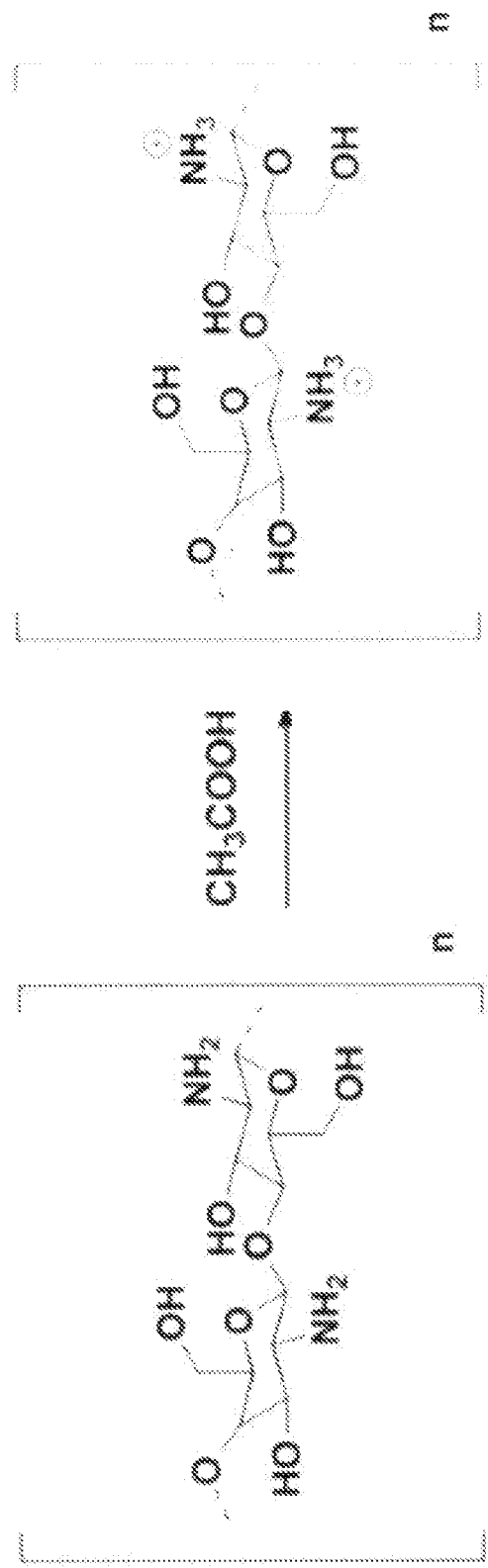
FIG. 3 illustrates an exemplary chitosan reaction to produce protonated chitosan.

FIG. 3 illustrates an exemplary chitosan reaction to produce protonated chitosan. Oxide groups are negatively charged. Protonating the chitosan results in a positively charged bio-polymer that produces electrostatic binding between the oxides and chitosan.

Figure 4:
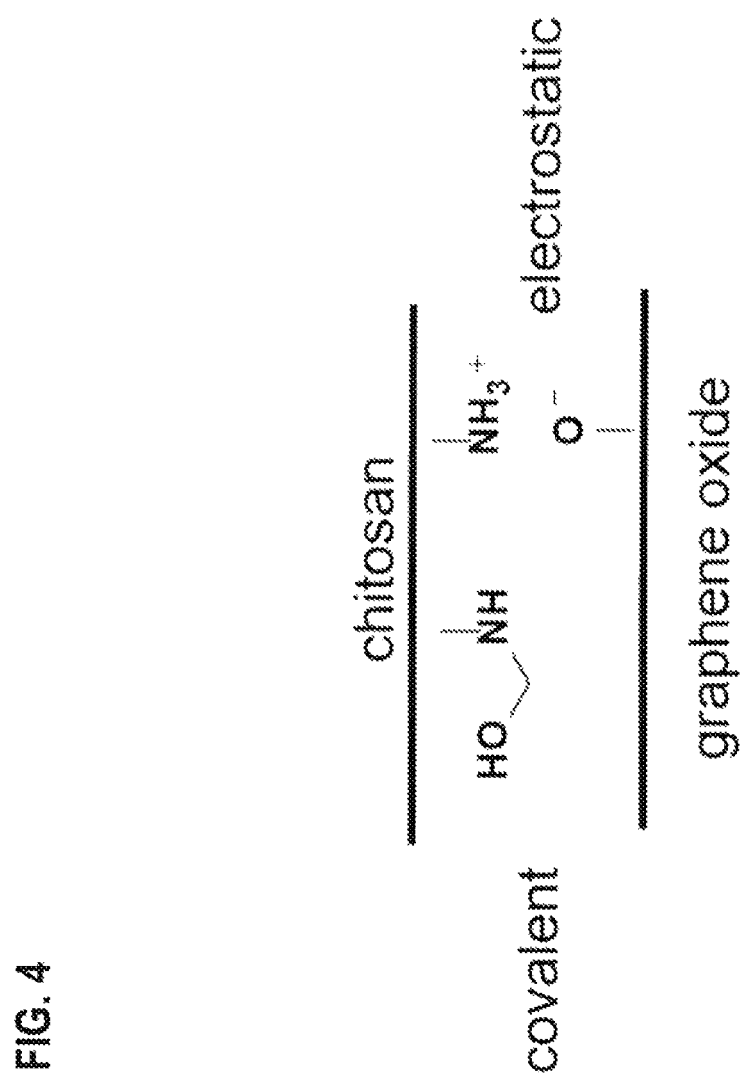
FIG. 4 illustrates the cross-linking of graphene oxide and chitosan.

FIG. 4 illustrates the cross-linking of graphene oxide and chitosan. The chitosan and graphene oxide cross-link by electrostatic bonding or covalent reaction, depending on the oxide group selected.

Figure 5:
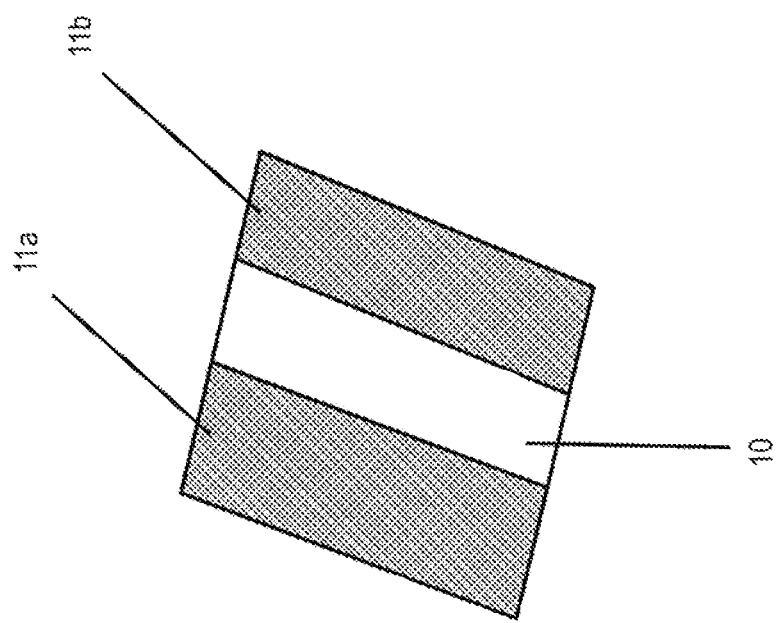
FIG. 5 illustrates an exemplary layered structure of a CGSO filter.

FIG. 5 illustrates an exemplary layered structure of a CGSO filter. In the exemplary embodiment, the CSGO filter 100 includes a CSGO filtration membrane 10 that is placed between support layers 11a and 11b. Layers 11a and 11b support the filtration membrane 10 to prevent swelling and deformation.

In the exemplary embodiment shown, the CSGO filtration membrane 10 is placed between two nitrocellulose filters, which provide stability in a cross flow system. Nitrocellulose is selected because it non-reactive with contaminants passing through and is scalable. Other materials with similar characteristics may be substituted.

In other embodiments, the support layers 11a and 11b may be comprised of different material such as paper, glass wool and permeable plastic.

Figure 6:
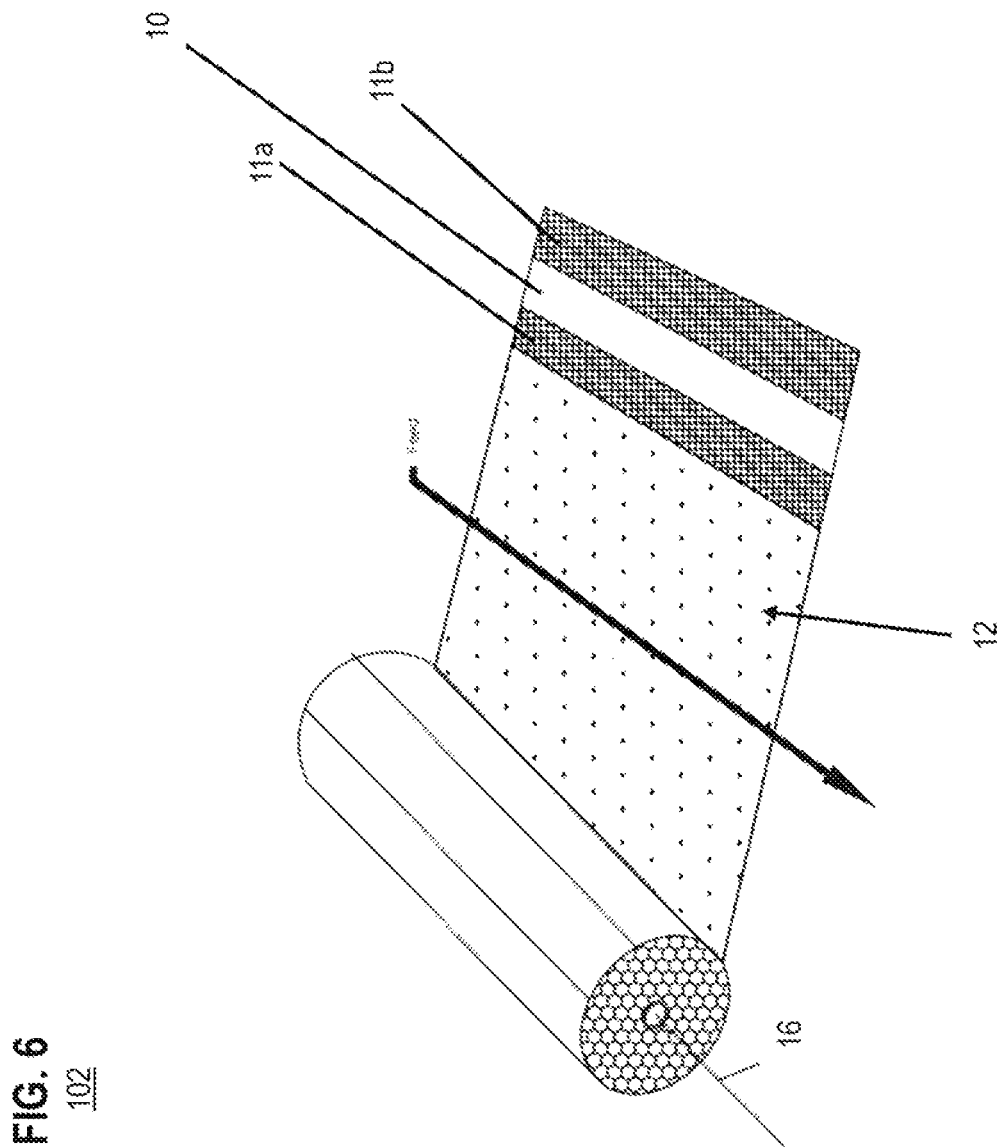
FIG. 6 illustrates a CGSO filter which is spiral shaped.

FIG. 6 illustrates a CGSO filter which is spiral shaped. Visible elements of the spiral shaped CSGO filter 102 includes the CGSO filtration membrane 10 and support layers 11a and 11b. As noted, layers 11a and 11b are constructed of a permeable material which supports cross-flow motion of passing fluids, gases, etc.

The spiral shaped CSGO filter 102 may also include a spacing layer 12 for. The spacing layer 12 is an optional layer used in the spiral embodiment to create additional spacing for water flow between respective support layers 11a and 11b.

In the exemplary embodiment, the spiral shaped CSGO filter 102 further includes a clean water collection pipe 16. The clean water collection pipe is a structure that allows clean, treated water to be collected and dispersed away from the filter.

Figure 7:
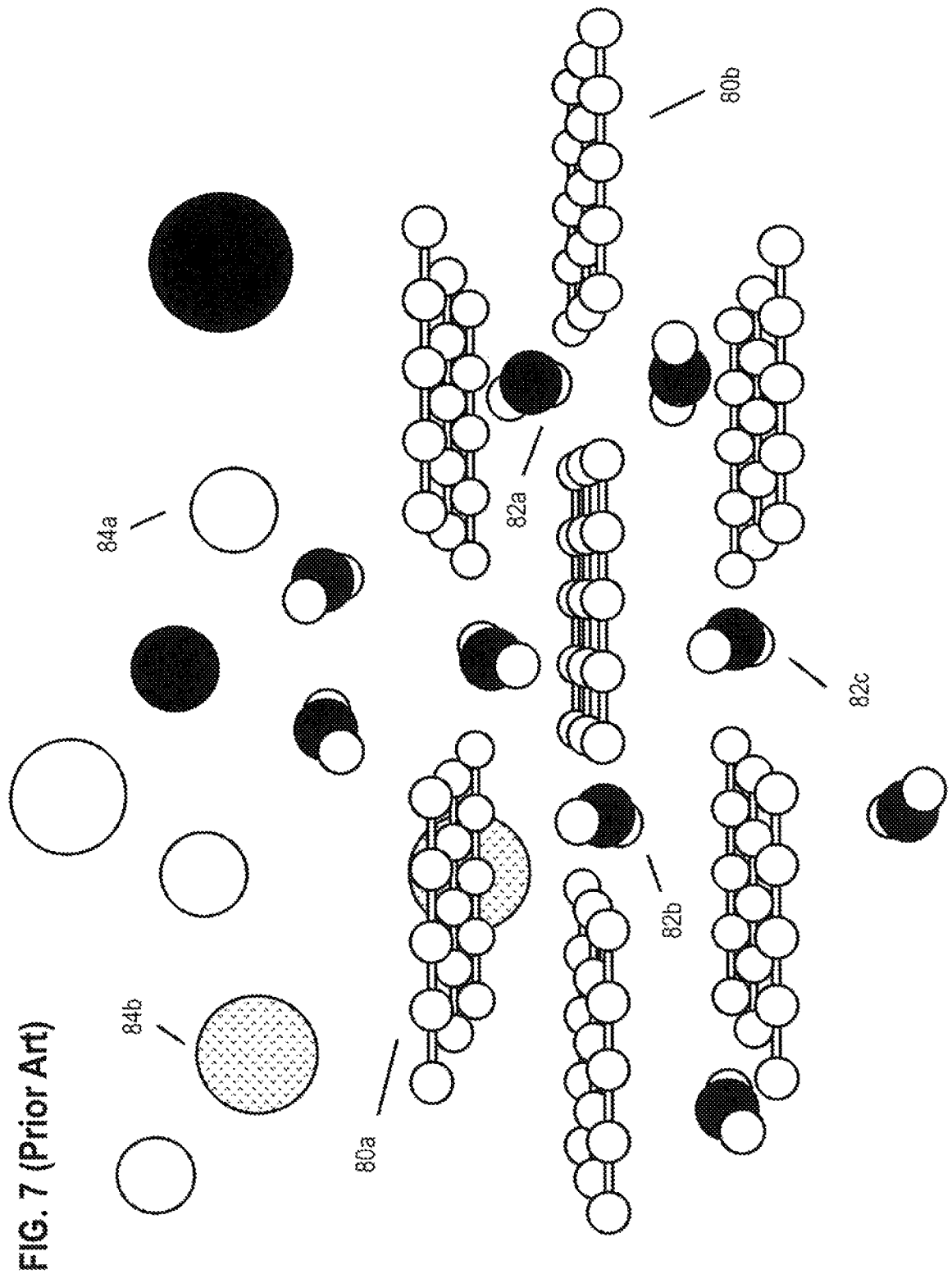
FIG. 7 (Prior Art) illustrates a channel structure formed in a CSGO membrane during the evaporation process.

FIG. 7 (Prior Art) illustrates a channel structure formed in a CSGO membrane during the evaporation process. Graphene oxide has a flakey structure which must be cross-linked to form a competent membrane. The flakes form irregular channels 80a and 80b through which water molecules 82a, 82b and 82c can pass. Contaminant molecules 84a and 84b cannot pass though the channels 80a and 80b.

Figure 8:
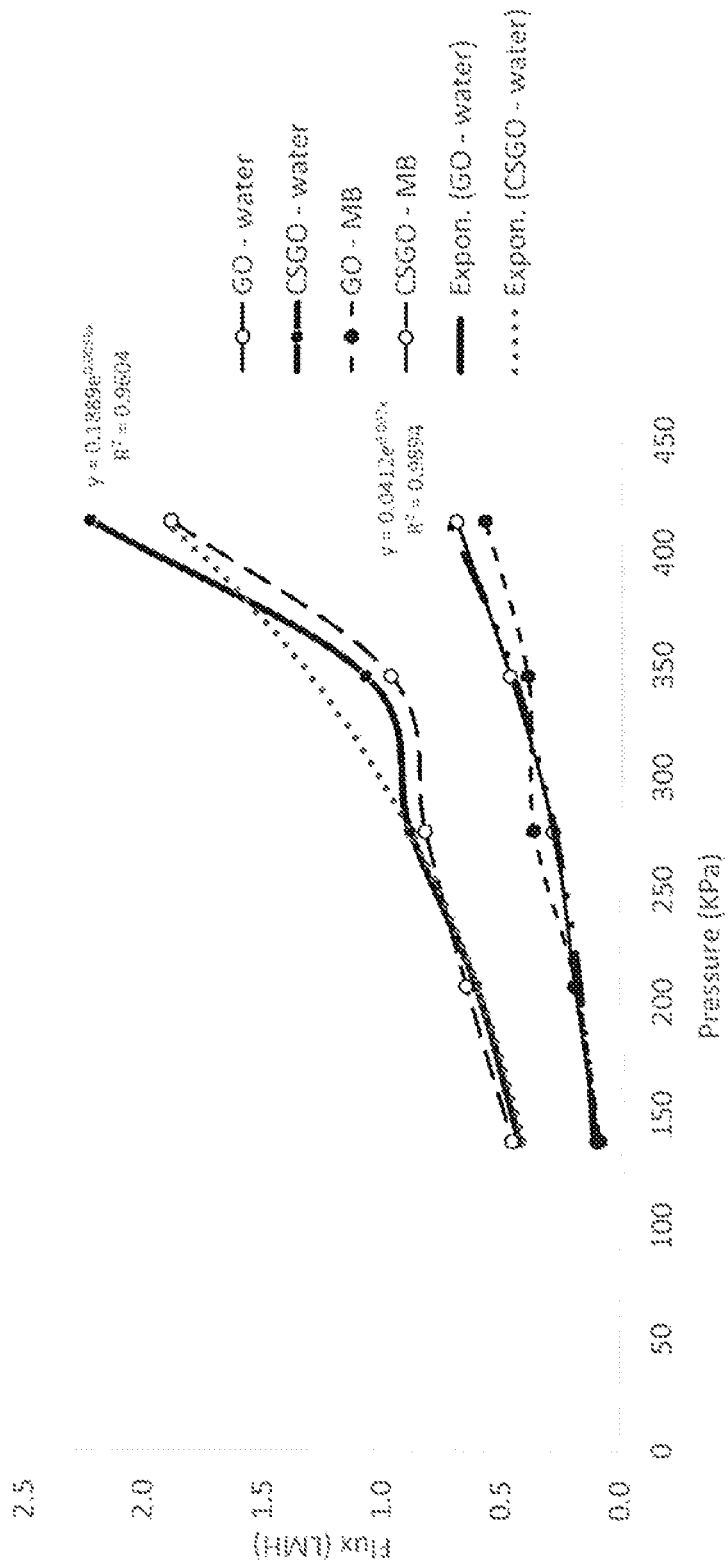
FIG. 8 is a graph illustrating the improved flow rate of a GSGO filter over a graphene oxide filter.

FIG. 8 is a graph illustrating the improved flow rate of a GSGO filter over a graphene oxide filter. Improved flow is to attributable to improved channel structure, where the channel structure is slightly widened because the chitosan increases the space between the chitosan flakes. The chitosan improves the structure of the channels formed in the membranes during the evaporation process. Resultantly, these factors increase the rate of water flow without compromising contaminant rejection.

FIG. 9 is a chart illustrating the flux rate of a CSGO membrane as compared to other membrane compositions. The water flows more freely through the membranes because of the addition of the chitosan.

FIG. 10 is a chart illustrating the comparative performance of a CSGO filter to a graphene oxide filter and an nano-filtration member. The CSGO filter exhibited a higher flux rate as compared to a graphene oxide membrane and reverse osmosis membranes.

The exemplary chart reflects test results for methelyne blue. The membrane was tested, for example, on treatment of cesium and ranged from 25 to 100%. Malathion removal ranged from 10 to 51%.

In this exemplary embodiment, the CSGO membrane was further tested against the following compounds in addition to methylene blue: cesium chloride, methyl orange, malathion and insensitive munitions (IM) formulation IMX-101. For each compound, removal rates are shown to degrade over the duration of the experiment. However, removal never ceased.

When using CSGO membranes prepared with granular graphene oxide (GO), methyl orange was initially removed entirely when fed at a concentration of 10 mg/L. The mechanism for removal appeared to be both adsorption and rejection for these membranes. For CSGO membranes prepared with nanofiltration GO, the initial removal was approximately 85% when fed at concentration of 10 mg/L. For these membranes, the dominant removal mechanism appeared to be adsorption.

For both membranes, the removal rate decreased over time. The flux related to the granular CSGO membrane varied between 1.5 LMH and 2.1 LMH; the flux for the nanofiltration CSGO membranes varied mostly within a range of 0.5 LMH and 0.6 LMH.

Malathion was initially removed at a rate of 80% for an inlet concentration of 100 mg/L and 75% for an influent concentration of 1000 mg/L. These removal results were identical to those measured for nanofiltration (NF) membranes. For both inlet concentrations, the flux for the CSGO membranes was 2 L/m$^2$-hr (LMH). CSGO membranes prepared using granular graphene oxide (GO) were used for these experiments.

IMX-101 contains three major compounds, including nitrotriazolone (NTO), 2,4-dinitroanisole (DNAN), and nitroguanidine (NQ). A solution containing 600 mg/L of NTO, 150 mg/L of NQ, 9 mg/L of DNAN, and 7 mg/L of 2,4,6-trinitrotoluene (TNT) was fed to CSGO membranes prepared with granular GO; TNT was included as a traditional munitions compound for comparison. These membranes initially removed 100% of the TNT, 100% of the DNAN, 65% of the NTO, and 5% of the NQ.

The removal rates of TNT and DNAN exceeded those of reverse osmosis (RO) membranes used for comparison. The removal rates of NTO and NQ were at a deficit compared to RO membranes, however. The removal rates of NTO, TNT, and DNAN exceeded those of NF; the removal rate of NQ was essentially identical between CSGO and NF membranes. The flux of this solution related to CSGO membranes was 1.5 LMH.

What is claimed is:

1. A method of making a highly-resilient fluid and gas apparatus comprised of the steps of:
   protonating a quantity chitosan to create protonated chitosan;
   mixing a quantity of granular graphene oxide with said protonated chitosan to create a solution; filling a molding structure with a quantity of said solution;
   evaporating said solution on a surface to create a membrane having a target thickness; and placing said membrane between two layers; wherein said quantity of chitosan and said quantity of graphene have a ratio between 4:1 and 6:1; and wherein a target thickness ranges from 5 to 200 microns and a target flow rate of at least 1.5 LMH is achieved.

2. The method of claim 1 wherein said quantity of chitosan and said quantity of graphene have a 5:1 ratio.

3. The method of claim 1 in which the step of protonating includes the step of creating a homogeneous mixture by rendering the chitosan water soluble.

4. The method of claim 1 wherein said layers are cellulose layers.

5. The method of claim 1 wherein said layers are comprised a material selected from the group consisting of paper, glass wool and permeable plastic.

6. The method, of claim 1 wherein the step of protonating further includes combining said quantity of chitosan with an acid.

7. The method of claim 6 wherein said acid is selected from the group consisting of Acetic Acid, Malic Acid, Succinic Acid, Glycolic Acid, Oxalic Acid, Adipic Acid, Citric Acid, Formic Acid Carboxylic Acid, Sulfonic Acid, Muriatic Acid and Tannic Acid.

8. The method of claim 6 wherein said acid is organic.

9. The method of claim 1 which further includes placing two or more of said membranes in serial configuration to accomplish a multi-staged filtration process.

10. The method of claim 1 wherein a target rejection rate of at least 97.5% is achieved.

* * * * *